(12) United States Patent
Braun et al.

(10) Patent No.: US 8,532,329 B2
(45) Date of Patent: Sep. 10, 2013

(54) DEVICE AND METHOD FOR TESTING SYSTEMS WITH VISUAL OUTPUT

(75) Inventors: Hartmut Braun, München (DE); Bernd Gumpel, München (DE); Jürgen Müller, Schwarzenbach an der Saale (DE)

(73) Assignees: Europcopter Deutschland GmbH, Donauworth (DE); ESG Elektroniksystem Und Logistik GmbH, Furstenfeldbruck (DE)

( * ) Notice: Subject to any disclaimer, the term of this patent is extended or adjusted under 35 U.S.C. 154(b) by 1070 days.

(21) Appl. No.: 12/536,997

(22) Filed: Aug. 6, 2009

(65) Prior Publication Data

US 2010/0067735 A1  Mar. 18, 2010

(30) Foreign Application Priority Data

Aug. 7, 2008 (DE) .......................... 10 2008 036 759

(51) Int. Cl.
*G06K 9/00* (2006.01)
*G01L 25/00* (2006.01)
*G01M 7/00* (2006.01)
*G01N 19/00* (2006.01)

(52) U.S. Cl.
USPC ........... 382/100; 702/113; 702/127; 73/865.9

(58) Field of Classification Search
USPC .................... 382/100, 141–153, 112; 702/31, 702/32, 108, 113, 1, 115, 127, 182, 183; 356/71, 72, 73, 388, 394; 345/156, 184; 324/73.1; 73/432.1, 865.9
See application file for complete search history.

(56) References Cited

U.S. PATENT DOCUMENTS

| | | | |
|---|---|---|---|
| 6,698,293 B2 | 3/2004 | Reinisch et al. | |
| 6,816,603 B2 * | 11/2004 | David et al. | 382/107 |
| 7,610,841 B2 * | 11/2009 | Padan | 89/1.815 |
| 7,643,915 B2 * | 1/2010 | Jackson et al. | 701/31.4 |
| 8,190,727 B2 * | 5/2012 | Henkel | 709/223 |
| 2008/0082284 A1 * | 4/2008 | Carroll et al. | 702/109 |

FOREIGN PATENT DOCUMENTS

| | | |
|---|---|---|
| DE | 94 01 197 | 5/1994 |
| DE | 198 50 977 | 5/1999 |
| DE | 100 13 137 | 10/2001 |
| DE | 100 37 412 | 3/2002 |
| EP | 2154591 A1 * | 2/2010 |
| GB | 2 335 244 | 6/2002 |
| JP | 2008-175681 * | 7/2008 |
| WO | WO 01/46909 * | 6/2001 |

* cited by examiner

*Primary Examiner* — Shefali Goradia
(74) *Attorney, Agent, or Firm* — Brooks Kushman P.C.

(57) ABSTRACT

The invention relates to a device and a method for testing systems or devices with visual output and at least one mechanical input element. The device comprises an input unit for the automated mechanical actuation of the at least one input element of the device, an image analysis unit, which acquires and analyzes the visual output of the device, and a control unit, which controls the input unit and image analysis unit, and automatically determines a test result based on predetermined desired outputs and the findings of the image analysis unit.

20 Claims, 3 Drawing Sheets

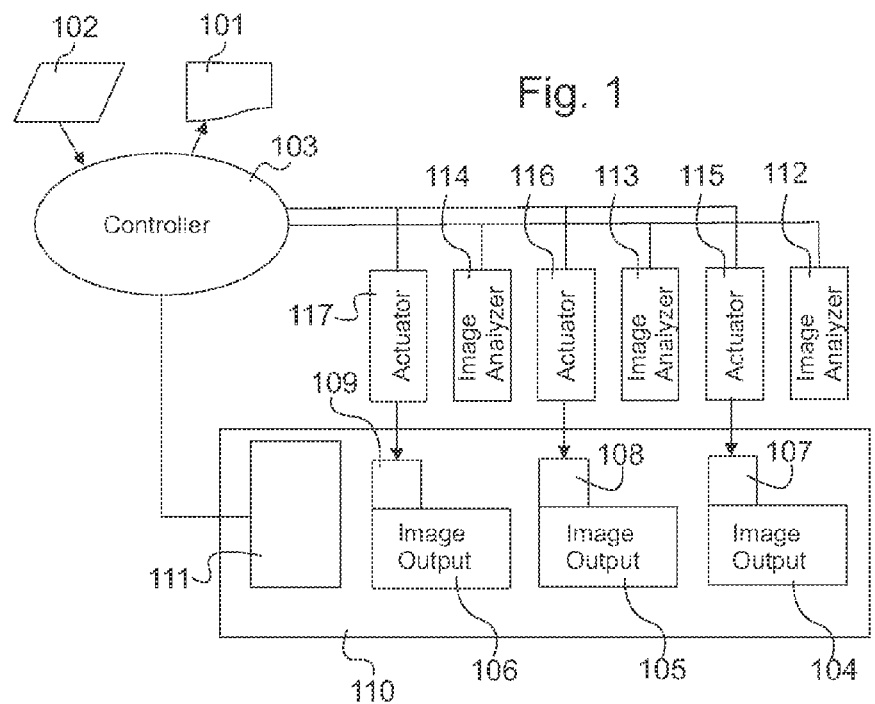
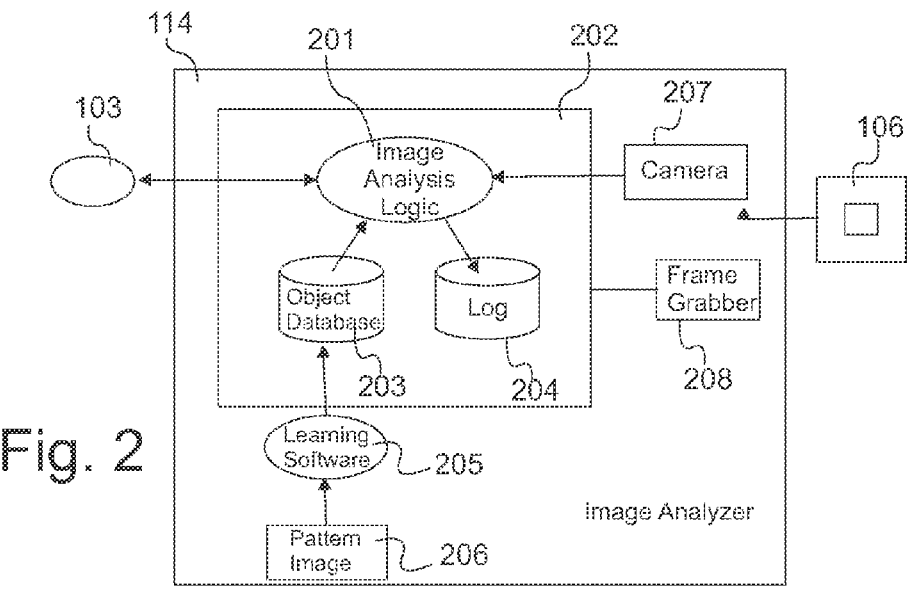

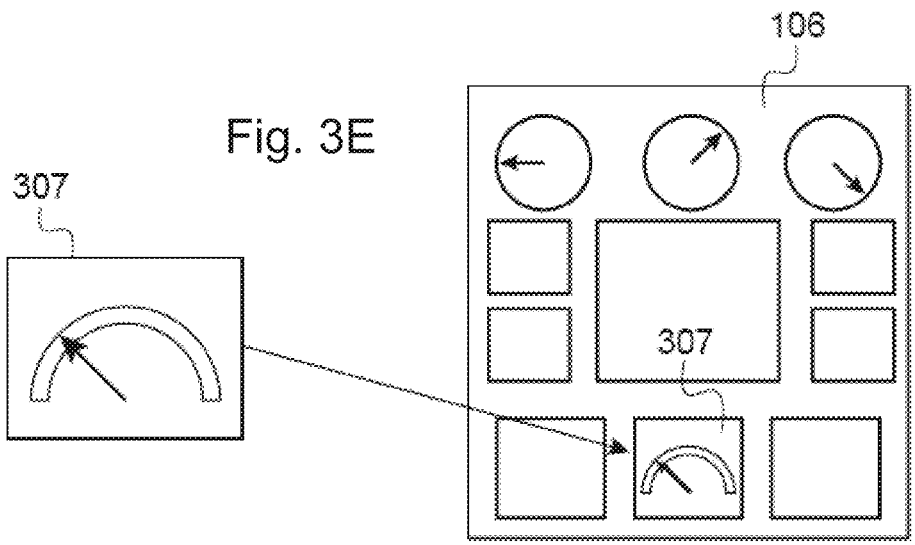
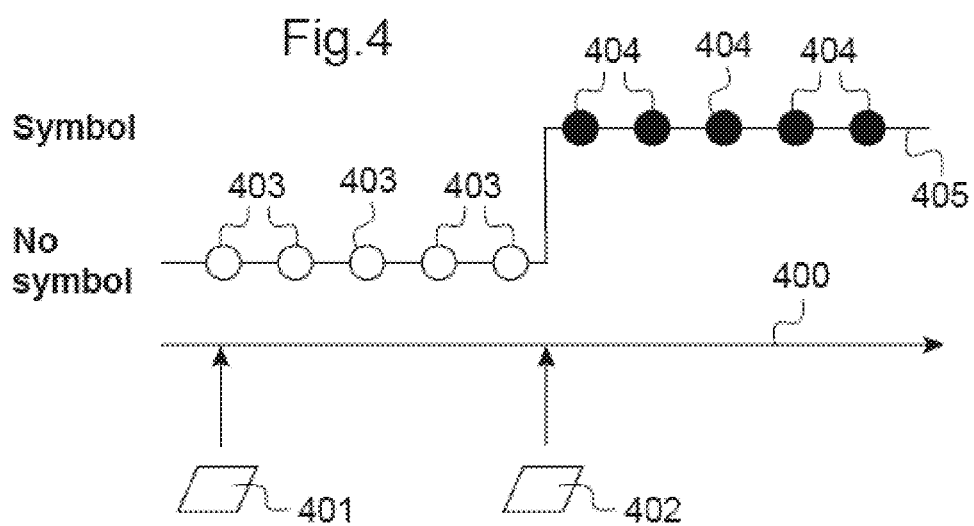

DEVICE AND METHOD FOR TESTING SYSTEMS WITH VISUAL OUTPUT

FIELD OF THE INVENTION

The present invention relates to a device and a method for testing systems or devices with visual output.

The use of digital technology in modern systems greatly increases the functional scope and complexity of such systems. In general, an attempt is simultaneously made to concentrate operation to as few display devices and control elements as possible. The demand on quality is very high in many areas, for example in particular in security-critical systems in aeronautics or the automotive industry. This situation results in a disproportionately rising number of tests that are necessary to cover the complete functional scope of modern systems and adequately meet the high quality demands placed on these systems.

In particular in security-critical systems in aviation, the complexity and quality demands are so great that the required tests can hardly be implemented manually any longer, since several 1000 up to 10,000 test steps are not unusual in this conjunction. In addition, subjectivity must be viewed with a critical eye when humans evaluate the findings, as it can be a source of errors that cannot be overlooked.

BACKGROUND OF THE INVENTION

There has to date been no process for completely automating the process of testing such complex systems, which contain optical output units, such as displays, instruments, etc., as well as mechanical input units, such as keys, switches, buttons, etc. An operator is required to make the correct, often mechanical, inputs depending on the test to be performed, and to evaluate the optical outputs. Technical systems that contain display devices and control elements are currently tested in such a way as to manually actuate the inputs and visually check the outputs. The tester derives the test result from a comparison of the observed and expected display, and logs the latter. The disadvantages to this approach include:
  It is time-consuming, as a result of which acceptance tests in the aviation industry can stretch out over several months;
  It is error prone owing to the long testing times and monotonous operations, tester fatigue and subjective assessment of the job;
  It results in quality losses due to a limited capacity of the test person; for example, there are limits to the ability of a test person to observe the response of a display over time and/or monitor multiple and parallel outputs; and
  It lacks reproducibility.

OBJECT AND SUMMARY OF THE INVENTION

The object of the present invention in particular is to fully automate the functional tests of the display devices and control elements, so as to master the range of tests at an elevated quality. In addition, the object is to surmount the aforementioned disadvantages of the previous method.

The invention relates to a device and corresponding method for testing devices with visual output and at least one mechanical input element. The device comprises an input unit for the automated mechanical actuation of the at least one input element of the device, an image analysis unit, which acquires and analyzes the visual output of the device, and a control unit, which controls the input unit and image analysis unit, and automatically relays a test result based on predetermined desired outputs and the findings of the image analysis unit. It can be advantageous among other things for documenting the tests and potential subsequent processing to store the test results and/or information relating to the input and the visual output.

The invention can be preferably be used for testing security- and quality-relevant devices, e.g., in the aeronautics industry. In this area, mention must be made in particular of the central computer systems and visual displays from the cockpit or pilot console of an aircraft or helicopter, which require extensive testing. In this case, the mechanical input elements can be buttons, knobs or switches in the cockpit, which can be actuated automatically via an input unit of the testing device. An input unit can be realized in the form of a controllable robot arm or an actuator that operates together with an input element, for example. The visual output can involve control lamps, displays, onboard instruments like altimeters, compass, etc., along with primary flight displays or multifunction displays (MFD), used among other places in contemporary electronic flight information systems (EFIS). The visual output of the device in the device according to the invention is acquired by means of a camera, a frame grabber and/or a digital image input via the image analysis unit, for example.

A specimen consisting of several components or various input elements, computers and visual outputs can be viewed as another embodiment of a device to be tested or a specimen. One example for testing such a specimen consisting of several components involves the testing or inspection of a so-called functional chain, in which the reactions to mechanical inputs are tested in a series of visual outputs. For example, mechanical inputs can be made on a control display unit (CDU) and an MFD. Different computers can evaluate the mechanical inputs. Various visual outputs can then appear on the CDU, MFD and/or a helm visor. It might here be necessary to initially activate a specific visual output, e.g., the helm visor, with another interspersed mechanical input. In this way, an entire functional chain can be analyzed, testing the functionality of a series of interdependent components of a specimen. As an example, various visual outputs can be tested as a reaction to a mechanical input. To this end, it may be necessary for additional mechanical inputs to be actuated during the execution of a test, e.g., to activate another or alternative visual output.

In one example, the specimen could be a complete aircraft system. Entire, mostly complex, functional chains of the specimen can then be tested as a reaction to a mechanical input or a series of mechanical inputs. Various visual outputs can be analyzed in sequence or even in parallel. The latter could also encompass extra visual outputs introduced for test purposes at defined test points within the functional chain. Such test points can be advantageous for testing partial components of the overall system. As already mentioned, it might here be necessary to activate these visual outputs via additional mechanical inputs.

In another aspect of the invention, the control unit has a flowchart based on which a sequence of tests is performed with different inputs and desired outputs. This flowchart can be formulated in a proprietary test description language, for example. However, a standardized markup language like XML or programming language line C is preferably used. The control unit interprets this XML code, and then instructs the input unit to make certain mechanical inputs, i.e., press a button or actuate a specific switch. In addition, the flowchart encompasses information about the desired outputs expected for the present test. These are relayed to the image analysis unit, which searches for specific elements in the acquired visual output and determines their attributes based on the desired output. If the control unit determines that the attributes of the elements found in the visual output determined by the image analysis unit satisfy the expectations of the desired output, the test result is positive; otherwise, the test is usually regarded as not having been passed. The test results including the acquired visual output can be stored for subsequent further processing or post-processing. The control unit can then perform the next test per the flowchart.

In order to completely test the device, it may be advantageous for the device to further encompass a data interface for the exchange of data between the control unit and the device to be tested. The control unit can provide the device simulation data for device peripherals via such a data interface. This is the case in particular with respect to tests of complex computer systems, e.g., the computer systems of an aircraft. The device peripherals here include the plurality of sensors, measuring devices, (altimeter, compass, flow mater, tachometer, etc.) and aircraft components (propulsion systems, ailerons, landing gear, etc), which provide the computer system with data that are processed there and then displayed on the visual output. Therefore, it may be expedient for the complete performance of the test to provide the computer system with simulation data for the device peripherals via the data interface, and thereby test whether a deployed landing gear is being correctly displayed on the visual output.

It can here be advantageous for all results within the test system, in particular the inputs initiated by the input unit, the reactions of the visual output of the device acquired by the image analysis unit and the inputs and outputs performed by the data interfaces be able to be provided with a time stamp, and that the control unit can also provide all actions with time stamps. For example, this makes sense in particular when tests are to be run on the reaction time of the device, e.g., the computer system of the aircraft. It may be necessary, for example, for a warning lamp to display a change in cabin pressure as defined by a threshold value within a predetermined timeframe. It could here also be necessary for the warning lamp to blink at a certain frequency, which can also be taken into account by providing the acquired visual output and mechanical input with time stamps.

In another aspect of the invention, the image analysis unit encompasses an object database with visual attributes of the patterns/objects to be found by the image analysis unit. These attributes preferably consist of any combination of specific aspects, e.g., the presence of a predefined pattern and/or objects, certain positions of patterns and/or objects within the visual display, certain colors and/or color combinations, predefined texts and predefined shapes. The chronological progression of an attribute, e.g., blinking, could be defined as one aspect of an attribute, and thereby taken into account in the object database. It is advantageous to define certain visual attributes so as to cover the full range of possible visual outputs that can arise given the usually high number of test steps. For example, attributes can be determined using interactive learning software, which records a predetermined desired output from a system specification, extracts the visual attributes to be measured from the latter, and stores it in the object database.

Therefore, a test step can be defined using the attributes from the object database and defining predetermined desired outputs, which at least encompass a visual attribute from the object database. In particular in security-relevant systems, e.g., the central computer system of an aircraft, it may here be necessary for the desired output to encompass the entire visual output in addition to the at least one visual attribute. This may be required to make sure and check for not just the presence of visual attributes, but also verify that the remaining visual output does not change unexpectedly. For example, this can be assured by acquiring the current visual attributes at the beginning of a test step and combine them as a background output with the predetermined visual attributes into the visual desired output. This approach can insure that the entire visual output is checked and tested at all times, even when using visual attributes. In addition, it can be useful to stipulate one or more partial areas of the remaining visual output in the definition of a test step that are to be excluded from the testing of the remaining visual output. As a result, expected changes in the remaining visual output that cannot or should not be represented by visual attributes will not yield a false negative test result. This situation is encountered in particular in test development phases.

In another aspect of the invention, the image analysis unit encompasses a comparison unit, which determines whether the at least one visual attribute is present within the visual output in a prescribed environment. If the entire visual output is to be checked, the comparison unit can further determine whether the visual output remains unchanged except for the presence of the at least one visual attribute. To search for the visual attributes within a visual output, the control unit can define an environment, i.e., a segment, within the visual output. This environment can be part of the desired stipulations for the present test step, but can also be used for accelerating test implementation, since the image analysis unit only has to monitor and evaluate a smaller area of the visual output.

Image processing algorithms are preferably used to determine whether the at least one visual attribute is present in the visual output and/or to determine whether a desired attribute graphically coincides with segments of the visual output. These image processing algorithms generally encompass functions like pattern recognition, edge detection and shape recognition, which are most often used in whatever combinations desired.

BRIEF DESCRIPTION OF THE DRAWINGS

The invention will now be described in greater detail based on an exemplary embodiment. Shown on:

FIG. 1 is an exemplary embodiment of the testing device according to the invention;

FIG. 2 is an exemplary embodiment of an image analysis unit of the testing device according to the invention;

FIG. 3A to 3E are examples for analysis aspects taken into account by the testing device; and FIG. 4 is an example for the time-related aspects taken into account by the testing device.

MORE DETAILED DESCRIPTION

Figure 3A:
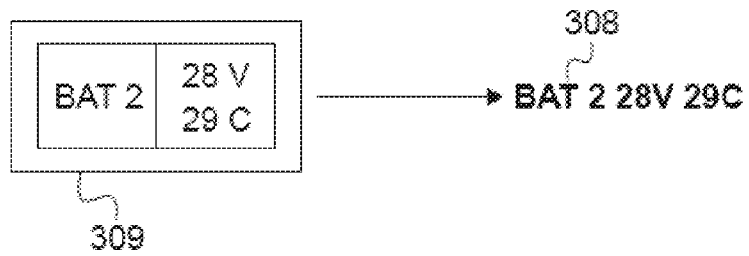

As already mentioned, the invention relates to a device and method for the fully automatic testing of systems with mechanical input and visual output. An exemplary embodiment for such a testing device is shown on FIG. 1. It depicts a specimen or device to be tested 110, which exhibits one or more image outputs 104, 105, 106 as well as one or more mechanical input elements 107, 108, 109. The number of mechanical input elements 107-109 is here completely independent of the number of image outputs 104-106. A device to be tested 110 can hence have more input elements 107-109 than image outputs 104-106 or vice versa. The visual or image outputs 104-106 can be of any type desired, e.g., LCD display, CRT display, lamps, display element, pointer, etc. Additionally conceivable are primary flight displays (PFDs), multi-functional displays (MFDs), control display units (CDUs), light-emitting diodes, helm visors, along with fittings from the automotive industry. It must here be remembered that the display 104-106 itself need not necessarily be tested, but preferably the entire system to be tested 110 in an end-to-end test. Such a system 110 can be the computer and control system of an aircraft or automobile, for example. However, other testing systems 110 are conceivable, incorporating mechanical input elements 107-109 and image outputs 104-106, including from medical technology (e.g., nuclear spin tomographs, etc.). The system 110 further encompasses one or more data interfaces 111, e.g., a bus system or an interface for exchanging analog or digital signals. The data interfaces 11 can be used to relay simulation values from sensors, e.g., propulsion system tachometers, to the specimen 110, thereby verifying the correct representation of the speed. In addition, outputs of the system 110 can also be tapped by the data interfaces 111, e.g., the digital signal of the image outputs 104-106. This can be advantage, for example, when only partial components of the system are to be tested, e.g., for isolating an error source.

The testing device for testing such a specimen 110 encompasses a control unit 103, which can be a standard testing system or a specific development. The control unit communicates via defined interfaces with one or more input units 115, 116, 117, which enable an automatic operation of the input elements 107-109 of the specimen, and with one or more image analysis units 112, 113, 114, which acquire and analyze the image outputs 104-106 of the specimen. In addition, the control unit communicates via the data interface 111 with the specimen itself 110.

A flowchart 102 is made available for the control unit 103, which essentially images the test provision, i.e., the test case to be implemented, and configures the other units of the testing device, i.e., in particular the input units 115-117 and image analysis units 112-114, as well as the specimen 110, for a test. Such a flowchart 102 can be written by a test engineer, for example. For each test case, the flowchart 102 contains instructions to the input units 115-117, stimulation data about the data interface 111, and desired outputs for the image outputs 104-106. Very strictly formalized test provisions/flowcharts 102 with precise information for the test personnel regarding mechanical inputs, image desired outputs and possibly additional data exchange via the data interface 111 are formulated in practice for the conventional test procedures already. These test provisions/flowcharts 102 can be worded directly in a language comprehensible to the control unit 103 for the testing method and testing device according to the invention, e.g., a descriptive or markup language like XML. Therefore, the outlay is comparable to the generation of test provisions for the conventional manual test procedures. In addition, it must be remembered that security-critical applications, e.g., aviation, require that the test provisions be qualified. In particular, care must be taken to acquire and test all image outputs 104-106 during automatic test implementation, i.e., not just the partial aspects of an image. This holds true especially for the disclosed automated test procedure, which requires a quality acceptance of the test provisions or test software, and frequently, in particular in aviation, approval from public quality assurance offices.

This flowchart is interpreted by the control unit 103 and initiates a test by:

using the data interface 111 or input units 115-117 to provide the specimen 110 with the stimulations required to enable the desired test step and display the image or visual output corresponding thereto; these stimulations can encompass sensor data and instructions for mechanically actuating switches/buttons, for example;

notifying the appropriate input unit 115-117 when it has to effect specific mechanical movements of the input elements 107-109, i.e., when it has to press which keys, or when it has to turn which knobs. For example, these movements can be initiated using actuators, which are realized as part of an input unit 115-117, and connected with the respective input element 107-109. The input unit 115-117 can then send back a status of the effected movements with time stamp to the control unit 103, wherein the time stamp denotes the actual time of the mechanical input on the input element 107-109; and notifying the image analysis units 112-114 which desired outputs are expected on the image outputs 104-106 of the specimens. For example, when a specific pattern is expected on the image output 104, the corresponding image analysis unit 112 is notified about the pattern to be recognized. The image analysis unit 112 loads the corresponding pattern form an object database, records an image of the image output 104, and initiates image recognition, during which it is determined whether the expected pattern actually appeared on the image output 104. Images are recorded and the analysis is performed until such time as the control unit 103 stops the respective test. The respective image analysis unit, e.g., 112 in the aforementioned example, continuously provides the control unit 103 with relevant information reduced to a few values during the test, such as the "pattern present" or "pattern not present" information, or data about position, color, recognized text, etc. Further, the image analysis unit 112 can store all relevant images in a log file.

Based upon the flowchart 102 and taking into account the returned values, i.e., in particular the information obtained from the image analysis units 112-114, return messages from the input units 115-117 and other information about the data interface 111, the control unit 103 can then automatically evaluate the test, and write the result in a test report file 101. On conclusion of a respective test, the next test can be started immediately. This enables a rapid, unsupervised testing of the device to be tested 110.

FIG. 2 shows an example for one of the image analysis units 112-114 of the testing device according to the invention. The image analysis unit 114 acquires the image output 106 of the specimen 110 based on image detectors, e.g., a digital camera 207 or a frame grabber 208 for the acquisition of an analog output signal. The digital camera 208 can be CCD cameras, CMOS or APD arrays. As an alternative, the signal of the image output 106 could also be acquired directly via a digital interface 111 of the specimen 110. The image output 106 acquired in this way is relayed to the image analysis computer 202, which encompasses image analysis software or image analysis logic 201. This image analysis software 201 analyzes the acquired image output 106 and inspects it for image objects, which are taken from an object database 203 based on instructions from the control unit 103. For post-processing purposes, the acquired image outputs 106 and possible intermediate results are stored in a video log 204. The information obtained from the analysis is output to the control unit 103.

The tasks of the image analysis unit 114 can be categorized as follows within the framework of a test. The requirements on the system to be tested 110 comprise the basis of the test. The flowchart 102 with the precise test progression and expected results is derived from the requirements. The requirements are most often set forth in an independent document with respect to the image output 106 of a specimen 110. The control unit 103 must convert these requirements into test instructions and test expectations for the input units 115-117, the image analysis units 112-114 and the device to be tested 111 itself. In order to accomplish this, the image analysis unit 114 enables the following functions, among others:

The visual appearance of graphic elements, e.g., a symbol or text, is recognized and evaluated;

The position in which a symbol is represented is determined, often as a function of other parameters;

In addition to recognizing the appearance or presence of a certain graphic element, it is recognized whether the remaining image output remains unchanged; this is intended to detect undesired side effects.

The image analysis unit 114 acquires the image of a camera 207 positioned in front of the optical output 106. As an alternative, a video signal can also be read in via a frame grabber 208, or a digital video stream can be read in directly. The image analysis unit 114 then analyzes the image and transforms the result into a form that can be directly compared with the expected values or desired outputs described in the requirements. The analysis of an image and search for a symbol or attribute can be simplified, or even further determined, by having the control unit 103 stipulate search parameters within the image for the test case to be implemented.

This analysis results in information such as "symbol is displayed" or "symbol is not displayed" or "symbol has correct shape" or "symbol does not have correct shape" or "symbol is in correct position" or "symbol is in incorrect position" or "symbol has the correct color(s)" or "symbol does not have the correct color(s)", etc. Background aspects, i.e., aspects of the remaining image output, can also be taken into account during the determination, so that one potential result might be "symbol is displayed and background remains unchanged" or "symbol is displayed but background image additionally changes".

The result for the respective test step, i.e., "test step passed" or "test step not passed", is derived directly from the result of such a comparison. All evaluated images are stored in the log file 204, so as to enable a subsequent manual additional evaluation.

As a precondition for detecting symbols or image elements, which often are generally also referred to as objects, in an image output 106, the image analysis unit 114 exhibits an object database 203, which encompasses a plurality of objects to be recognized and their attributes. To generate this object database 203, it is necessary that the information required for ascertaining these attributes be isolated form the image output 106, and be capable of separate storage. The necessary information can include a pattern to be recognized, the position of which on the screen is to be determined. The information can be isolated by means of learning software 205, for example, which makes it possible to ascertain the attributes to be isolated in an automated or partially automated/interactive process from a pattern image or a specification 206. In addition to the attributes and pure image or visual information, information about the position of attributes within the image output 106 can here be acquired as well. Of course, possibilities other than ascertaining attributes via learning software 205 are also conceivable, not least the direct input from specifications into the object database 203.

Figure 3B:
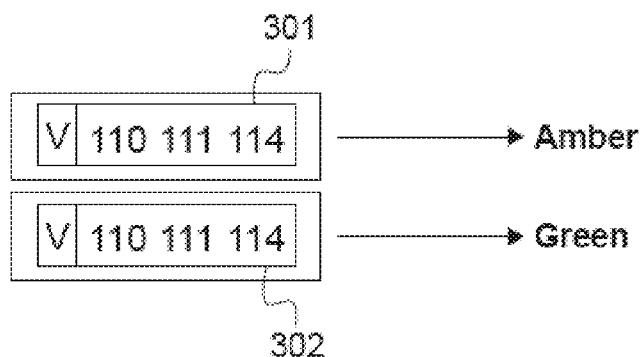

FIG. 3A to 3E show exemplary comparison and analysis steps for the image analysis unit 114. The image analysis unit 114 on FIG. 3A determines whether a certain stroke 308 is displayed in an image output 106. The image analysis unit 114 is capable of extracting such a text 308 from the image representation 309. The image analysis unit 114 on FIG. 3B is to determine whether a certain screen section assumes a certain color as a reaction to a mechanical input. The image analysis unit 114 is able to recognize that the stroke 301 is shown in amber, while the stroke 302 is shown in green.

Figure 3C:
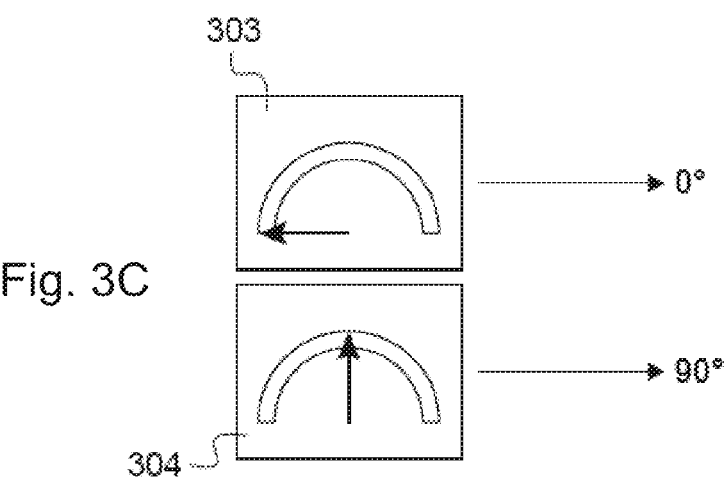
Figure 3D:
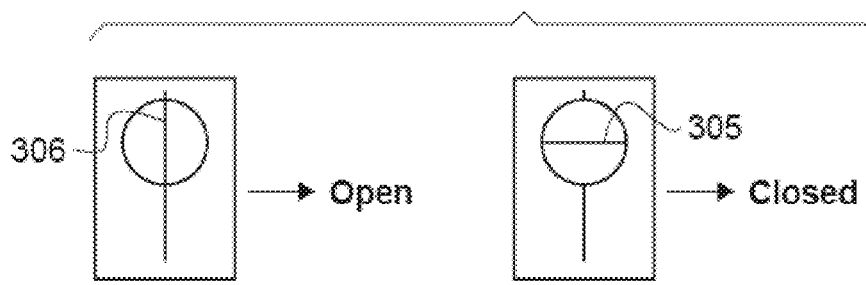

The image analysis unit 114 is further able to recognize predefined edges in an image output 106. FIG. 3C shows a pointer in an upper position 303 of 0 degrees (top of image) and in a lower position 304 of 90 degrees (bottom of image). The image analysis unit 114 can use edge recognition to determine the precise position of the pointer, and thereby convert the pointer position into a numerical value. As another example, FIG. 3D depicts the shape recognition capabilities of the image analysis unit 114. The left image shows an image symbol 306 for an open valve, while the right image shows an image symbol 305 for a closed valve. The application of shape-recognition methods allows the image analysis unit 114 to recognize these symbols 306 and 305, and to thereby determine whether a valve is being depicted as open or closed.

Finally, FIG. 3E shows the capabilities of the image analysis unit 114 for determining the precise position of a symbol 307 within the image output 106. This position must often be determined as a function of even more parameters.

The behavior of a tested system over time can also play an important role. For example, certain system requirements lay down the maximum amount of time that can elapse from the initiation of a keystroke until the symbol appears, or at what frequency a symbol has to blink. In order to test such requirements, image analysis must be performed continuously. As soon as the analysis has concluded, the results are relayed to the control unit 103, and a renewed analysis is initiated right away. All results are here provided with a time stamp. As shown by example on FIG. 4, the result can then be evaluated in the test control unit. In this case, FIG. 4 represents a time stream 400, and points 403 and 404 denote the acquired images of the image output 106. At time 401, a mechanical input takes place on one of the input elements 107-109. As a reaction to the input, the desired output at time 402 is expected to be that a symbol previously not displayed will be displayed. This expected progression or desired output is represented by the solid line 405. As evident from the example on FIG. 4, the image analysis unit 106 determines that no symbol as represented by the empty circles 403 is shown shortly before time 402, but that the desired symbol as represented by the solid circles 404 is depicted shortly after time 402. In this case, a "passed" test result can be derived from the above, since the actual time progression of the "symbol displayed" value corresponds to the expected time progression within defined tolerances.

The present invention disclosed a device and a method that make it possible to automate the testing of complex systems with mechanical input and image or optical output. This invention overcomes the problems associated with testing methods in prior art as described at the outset, and yields the following advantages, among others:

A significant reduction in time required for the test, and an associated significant reduction in costs, an improvement in time-to-market, and a more realistic feasibility of the required or desired test project;

A reduction in error proneness, since in particular errors owing to human failure can be diminished, and possibly even precluded entirely;

An increase in reproducibility, since potential interpretations by the human eye are precluded;

An increase in quality stemming from a wider test coverage, for example, since it is possible to simultaneously monitor all outputs and/or correlate the inputs and outputs;

The fact that tests can be executed unsupervised, so that test programs can be continuously and more quickly performed;

The fact that the disclosed method can in principle be used in any system with visual output; and The fact that subjective influences from the person evaluating the results along with irregularities in test implementation, e.g., caused by tired test personnel, can be eliminated.

REFERENCE LIST

101 Test report
102 Flowchart
103 Control unit
104, 105, 106 Image outputs of specimen 110
107, 108, 109 Input elements of specimen 110
110 Specimen, device or system to be tested
111 Data interface of specimen 110
112, 113, 114 Image analysis units of the testing device
115, 116, 117 Input units of the testing device
201 Image analysis software
202 Image analysis computers
203 Object database
204 Video log file
205 Learn software
206 Pattern image, specification
207 Camera
208 Frame grabber
301 "Amber" color of symbol
302 "Green" color of symbol
303 0 degree setting of pointer
304 90 degree setting of pointer
305 Symbol for closed valve
306 Symbol for open valve
307 Graphic symbol (within image output 106)
308 Stroke
309 Graphic representation of stroke 308
400 Time stream
401 Time of mechanical input
402 Time of an expected reaction by image output
403 Measured values (no symbol) of image analysis unit of image output
404 Measured values (symbol present) of image analysis unit of image output
405 Expected progression (desired output) of image output.

The invention claimed is:

1. A testing device for testing a system having a visual output and at least one mechanical input element, the testing device comprising:
   an actuator for the automated mechanical actuation of the at least one mechanical input element of the system;
   an image analyzer, which acquires and analyzes the visual output of the system; and
   a controller, which controls the actuator and the image analyzer, and executes a test of the system by controlling the actuator to actuate the at least one mechanical input element of the system and by automatically relaying a test result based on predetermined desired outputs and the findings of the image analyzer of the visual output of the system in reaction to the actuation of the at least one mechanical input element during the test.

2. The testing device according to claim 1, wherein the controller has a flowchart based on which a sequence of tests is performed with different inputs and desired outputs.

3. The testing device according to claim 2, wherein the flowchart makes it possible to test functional chains of the system via the sequence of tests.

4. The testing device according to claim 1, wherein the system to be tested is the central computer system of an aircraft.

5. The testing device according to claim 1, wherein the visual output is a multifunction display.

6. The testing device according to claim 1 further comprising:
   a data interface for the exchange of data between the controller and the system to be tested.

7. The testing device according to claim 6, wherein the controller is able to provide the system to be tested with simulation data for device peripherals.

8. The testing device according to claim 1, wherein the visual output of the system is acquired by a camera, a frame grabber, or a digital image input of the image analyzer.

9. The testing device according to claim 1, wherein the controller provides the test instructions to the actuator and tags the reactions of the visual output of the system acquired by the image analyzer with a time stamp.

10. The testing device according to claim 1, wherein the image analyzer encompasses an object database with visual attributes.

11. The testing device according to claim 10, wherein the attributes encompass any combination of the following aspects desired:
   Predefined pattern and/or objects;
   Certain position of patterns and/or objects;
   Certain colors and/or color combinations;
   Predefined texts; and
   Predefined shapes.

12. The testing device according to claim 11, wherein the predetermined desired output encompasses at least one visual attribute from the object database.

13. The testing device according to claim 10, wherein the predetermined desired output encompasses at least one visual attribute from the object database.

14. The testing device according to claim 12, wherein, in addition to the at least one visual attribute, the desired output encompasses the entire visual output of the system to be tested.

15. The testing device according to claim 13, wherein the image analyzer encompasses a comparator, which determines whether the at least one visual attribute is present within the visual output in a prescribed environment.

16. The testing device according to claim 15, wherein the comparator further determines whether, other than the presence of the at least one visual attribute, the remaining visual output remains unchanged.

17. The testing device according to claim 16, wherein the comparator determines whether the at least one visual attribute is present based on image processing algorithms, which encompass any combination of pattern recognition, edge detection and shape recognition desired.

18. The testing device according to claim 15, wherein the comparator determines whether the at least one visual attribute is present based on image processing algorithms, which encompass any combination of pattern recognition, edge detection and shape recognition desired.

19. The testing device according to claim 13, wherein the image analyzer encompasses a comparator, which determines whether the at least one visual attribute is present within the visual output in a prescribed environment.

20. A method for testing a system having a visual output and at least one mechanical input element, the method comprising:
- providing an actuator configured for the automated mechanical actuation of the at least one mechanical input element of the system;
- providing an image analyzer configured for acquiring and analyzing the visual output of the system; and
- executing a test of the system by controlling the actuator to actuate the at least one mechanical input element of the system and automatically relaying a test result based on predetermined desired outputs and the findings of the image analyzer of the visual output of the system in reaction to the actuation of the at least one mechanical input element during the test.

* * * * *